June 4, 1957  J. W. FIRTH  2,794,544
PACKAGE OF ARTIFICIAL SAUSAGE CASINGS
Filed Jan. 6, 1955

INVENTOR.
John W. Firth
BY
Brown, Jackson, Boettcher & Dienner,
Attys.

United States Patent Office 2,794,544
Patented June 4, 1957

2,794,544
PACKAGE OF ARTIFICIAL SAUSAGE CASINGS

John W. Firth, Chicago, Ill., assignor to Tee-Pak, Inc., Chicago, Ill., a corporation of Illinois Application January 6, 1955, Serial No. 480,129

2 Claims. (Cl. 206—46)

This invention relates to cartons for packaging artificial sausage casings and analogous articles.

Seamless cellulose sausage casings are extensively used in packing plants. Such casings are shipped in large volume, from the producer thereof to the user or packing plant, in shirred condition, in packages such as that disclosed in Patent No. 2,181,329, issued November 28, 1939, to Alfred G. Hewitt, in which the shirred strands of casing may be conditioned, in respect to moisture content, for stuffing. The shirred lengths or strands of casing are removed individually from the package as required and placed upon the horn of a stuffing machine by which the strand is filled or stuffed in a known manner, during which it is extended lengthwise. The stuffed casings, either individually or two or more tied together end to end, are passed through a linking machine and formed into connected links of uniform length. Linking machines presently used can be adjusted to form links as short as one inch in length, but the more common lengths of links are in the range of four to six inches. The finest adjustment of such machines is in one-quarter inch increments. After the stuffed casings have been linked, they are subjected to smoking, partial cooking and cooling operations, after which the links are separated and the casing removed. The resultant product is skinless wienerwurst sausages, commonly referred to as "wieners."

Wieners are prepackaged and sold in large volume in sealed packages, each package usually containing a predetermined number of wieners and weighing one pound or a multiple thereof. It is of importance that the wieners be of uniform size and weight in order that a given number—ten for example—will give a definite weight—one pound for example. If the wieners are not uniform, a package may be either short weight, which might cause serious trouble to the seller of such a package, or overweight, which represents a loss to the packer; both objectionable for obvious reasons. There is serious lack of uniformity in wieners produced under the present practice due to either over stuffing or under stuffing of the casings, attributable in many cases to the use of a stuffing horn of improper size for the casing being stuffed and, also, in some cases, to lack of uniformity in length of the links formed by the linking machine, due to improper adjustment thereof.

Producing stuffed links of uniform length and diameter assures that the resultant wieners will be of uniform weight, thus assuring that packages each containing the same number of wieners will all be of the same weight. In order to accomplish that result it is necessary that the correct size of stuffing horn be used for a given size of strand of casing and that the diameter and length of the stuffed links be checked accurately and frequently, to assure uniformity. To that end I provide a carton for use in a package such as that disclosed in the above identified patent, the carton having means for determining the proper size of stuffing horn to be used with the casing strands of the package, as well as the correct diameter of the stuffed pre-linked casing and the length of the links. That provides means readily available at all times to the operator at the stuffing bench for assuring uniformity of length and thickness or diameter of the stuffed links. Should there be any tendency to over stuffing or under stuffing, or to variation in length of the links, it can be quickly detected and corrected before any objectionable lack of uniformity occurs. In that connection, the use of the proper stuffing horn assists materially in stuffing the casing at the proper rate to assure accuracy. The carton is generally similar to that of the above identified patent but has closure flaps provided with gage openings for measuring the diameter of the stuffing horn and of the stuffed pre-linked diameter of the casing and is also provided on one closure flap with a scale for measuring the length of the links formed in the linking machine. The carton is formed of a material, conveniently wax impregnated paper board, such that no detectable alteration will occur in the gage openings of the flaps or in the scale, in the use of the carton in the manner disclosed in the above identified patent. The flaps having the gage means preferably are the inner closure flaps of the carton and are effectively protected by the outer closure flaps, when the carton is closed, guarding the gage means and the scale against injury or distortion such as might adversely affect their accuracy. The flaps having the gage means and the scale thus perform their usual function of closure elements, when the carton is closed, and also function as gage or measuring means when the carton is opened, as and for the purposes stated. Further objects and advantages of my invention will appear from the detail description.

Figure 1:
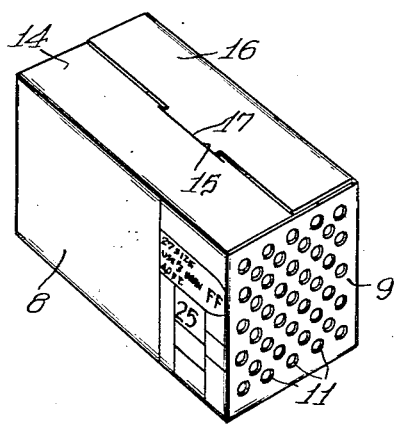
Figure 1 is a perspective view of a closed carton embodying my invention as used in a package of shirred strands of casings, such as that disclosed in the above identified patent.

The carton of my invention is formed from a wax impregnated blank of paper board of suitable gage, appropriately cut and scored and folded into carton form. It comprises side wall panels 7 and 8 and end wall panels 9 and 10, connected together along fold lines. The end wall panels 9 and 10 are provided with openings 11 as and for the purpose stated in the above identified patent. A top end closure flap 12 is attached to the upper edge of end wall panel 9 along a fold line, and a second top end closure flap 13 is attached to the upper edge of end wall panel 10 along a fold line. A top side closure flap 14 is attached to the upper edge of side wall panel 8 along a fold line and is provided, at the inner edge of its midportion, with a T slit 15. A second top side closure flap 16 is attached to the upper edge of side wall panel 7 along a fold line and is provided at the midportion of its inner edge with a substantially V-shaped shouldered tongue 17. When the top closure flaps are all closed, as in Figure 1, tongue 17 engages in slit 15 of flap 14 effective for holding them closed in overlying relation to the top end flaps 12 and 13, which are then effectively guarded by flaps 14 and 16, the inner portion of flap 16 then overlying the inner portion of flap 14 and providing additional protection for flaps 12 and 13.

Figure 3:
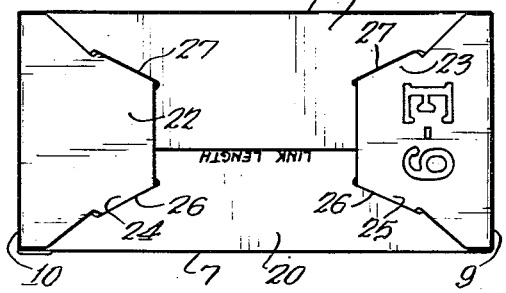
Figure 3 is an underneath view of the carton of Figure 1, with all of the bottom closure flaps closed.

An inner side bottom closure flap 20 is attached to the lower edge of side wall panel 7 along a fold line and a second or outer side bottom closure flap 21 is attached to the side wall panel 8, at the lower edge thereof, along a fold line. End bottom closure flaps 22 and 23 are attached to the lower edges of the end wall panels 10 and 9, respectively, along fold lines and are provided, at their inner portions, with locking tabs 24 and 25, respectively. When the bottom of the carton is closed, the inner portion of the bottom side closure flap 21 overlies the inner portion of the flap 20, and the end closure flaps 22 and 23 overlie the end portions of the flaps 20 and 21, with the locking tabs 24 and 25 engaging in appropriately formed slits 26 and 27 formed in the flaps 20 and 21, respectively, thus maintaining all of the flaps 20, 21, 22 and 23 closed, as shown in Figure 3. The end bottom closure flap 23 bears the notation "E-9" and the inner side bottom closure flap 20 bears the notation "link length" in close proximity to the inner edge of flap 21; to be referred to more fully later.

Figure 2:
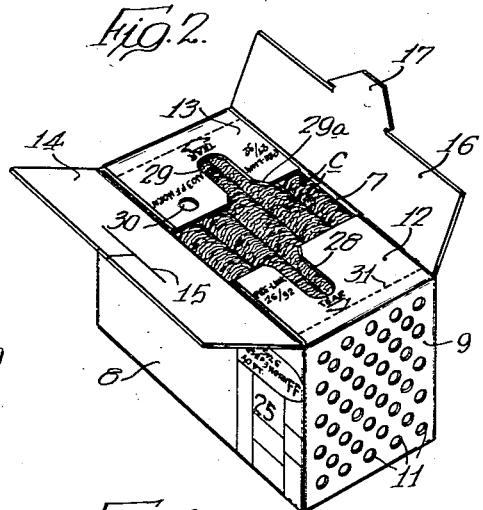
Figure 2 is a view similar to Figure 1 but with the outer top closure flaps open to expose the inner top closure flaps.

Referring to Figures 1 and 2 of the drawings, it will be noted that the side wall panel 8, which may be considered the front wall, has the following notation "27 size use No. 3 horn FF 40 ft. 25." That indicates that the package contains 25 strands of casing of size 27 each 40 feet in length, and that the horn to be used for stuffing such strands should be a No. 3 FF horn. The notation "E-9" previously referred to refers to the particular package or caddy which may contain casings of either of two sizes bearing the code Nos. 26-40 and 27-40 which vary slightly in respect to their proper pre-linked stuffed diameter. The stuffed diameter of the 26-40 casing should be not less than 23 nor more than 24 millimeters and that of the 27-40 casing should be not less than 24 nor more than 25 millimeters. The outside diameter of the stuffing horn to be used for such casings is the same and the permissible tolerances of horn diameter are ±.002 inch. Accordingly, the horn diameter gage, to be referred to presently, should be 0.003 inch over the recommended horn diameter. Referring to Figure 2, it will be noted that the end top closure flap 12 bears the notation "Pre-Link 26/32" which is a code number indicating the diameter of the casing. The closure flap 12 is also provided at its midportion with a slot 28 extending from its inner end, the outer portion of which is of semi-circular shape, slot 28 tapering slightly outward to the semi-circular portion thereof. The other end closure flap 13 bears the notation "Pre-Link 27/32" and is also provided with a slot 29 extending from its inner edge and tapering outwardly in width to an outer semi-circular end portion. The flap 13 is further provided with a circular opening 30 and adjacent thereto the notation "No. 3 F. F. Horn." The number 27 on the front wall panel 8 indicates that the package is a "27/40" package and, as above noted, the stuffed pre-linked diameter of the casings of such a package should be not less than 24 nor more than 25 millimeters. The outside diameter of the stuffing horn used with such casings should be 0.468 inch. Accordingly, the circular opening 30, which is to be used as a gage for determining the diameter of the stuffing horn, should be 0.471 inch. The outer semi-circular end portion of slot 29 has a diameter of 24 millimeters and the inner end of slot 29, at the inner ends of the bevels 29a, has a width of 25 millimeters. The width of slot 29 midway between the bevels 29a and the outer semi-circular end portion thereof is 24.5 millimeters. That is the mean between the minimum and the maximum permissable diameters of the stuffed pre-linked casing and the diameter of the casing when stuffed should be maintained at that value. The circular opening 30 provides a gage for quickly determining the proper size of horn to be used and the slot 29 provides a gage for checking the diameter of the stuffed pre-linked casing and thereby assuring uniformity in that respect. The slot 28 of the top end closure flap 12 is for use with "26/32" casings, the stuffed pre-linked diameter of which should be not less than 23 nor more than 24 millimeters, the width of slot 28 at its midportion being 23.5 millimeters. If the package contained 26-32 strands or casings, the diameter of the stuffed casing would be determined by slot 28 rather than slot 29 of flap 13, but the horn size would be determined by the circular opening 30, since the same size horn can be used for the two sizes of casings or strands which the E-9 package may contain.

The carton is constructed of wax impregnated paper board of suitable thickness or gage and the flaps 12 and 13 remain unaltered in dimensions in the use of the carton. Accordingly, the flaps 12 and 13 with the slots and opening therein provide reliable gage means for measuring the outside diameter of the stuffing horn and the diameter of the stuffed pre-linked casing. Further, in the closed condition of the package the flaps 12 and 13 are effectively guarded against injury by the side top closure flaps 14 and 16. Either of the flaps 12 or 13 may be used while attached to the body of the carton or, if desired, may be separated therefrom by tearing the flap along a tear line 31 provided by a row of perforations remote from the fold line between the flap and the end wall panel of the carton to guard against weakening of the latter. I thus provide gage means incorporated in the carton containing the lengths or strands of casings, such gage means being immediately available to the operator at the stuffing bench and providing a cost free tool for checking the horn diameter and the diameter of the stuffed pre-linked casing. Additionally, the top end closure flaps also function as closure means for the top of the carton.

Figure 4:
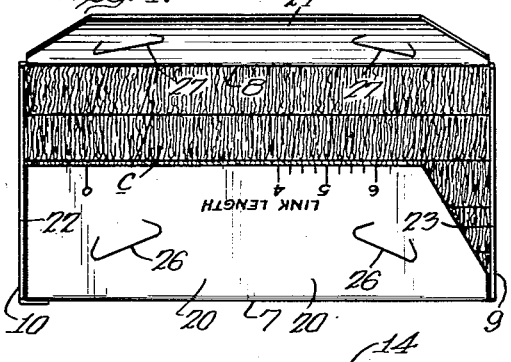
Figure 4 is a view like Figure 3 but with the end closure flaps and the outer one of the two side closure flaps opened to expose the inner one of the two side closure flaps.
Figure 5:
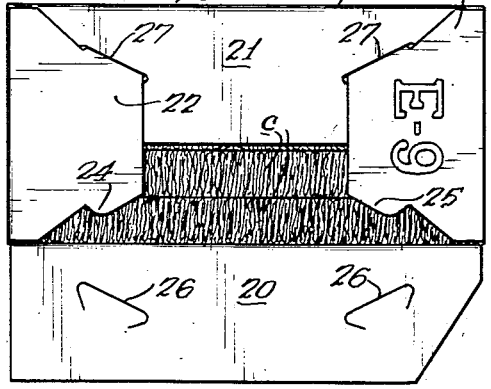
Figure 5 is a view like Figure 3 but with the two end and the outer side closure flaps closed and the inner side closure flap turned outward at right angles to the contiguous side wall panel of the carton.
Figure 6:
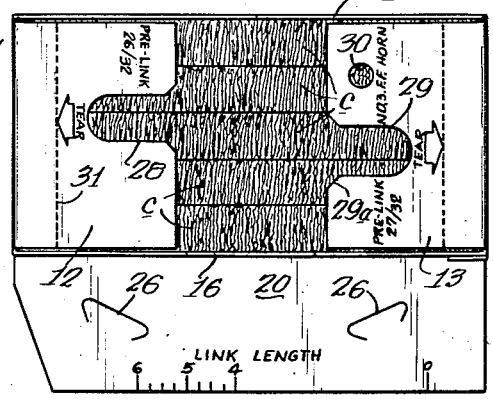
Figure 6 is a plan view of the carton and package of Figure 1 but with the top closure flaps positioned as in Figure 2 and the bottom closure flaps positioned as in Figure 5.

Referring to Figure 4, the side bottom flap 20 is provided at the inner portion thereof with a scale 6 inches in length from 0 to 6, the first four inches of which are ungraduated, the remaining two inches being graduated in ¼ inch lengths. The scale provides convenient means for measuring the length of the links formed in the linking machine. As previously noted, when the bottom of the carton is closed, the inner portion of flap 20 is guarded against injury by the overlying inner portion of flap 21. By securing the side bottom closure flap 21 closed by means of the end bottom closure flaps 24 and 25, as shown in Figure 5, bottom closure means is provided effective for retaining within the carton the lengths or strands c of the casings. The bottom closure flap 20 may then be turned outward perpendicular to the side wall 7, as in Figure 5, so that with the package in its upright position and opened at the top for removal of the casing strands as required, the scale on the bottom side flap 20 for measuring the length of the links is immediately available, as well as the gage means of the top end closure flaps. I thus provide as part of the package gage means for determining the stuffing horn diameter and the diameter of the stuffed pre-linked casing, as above described, as well as means for measuring the length of the links formed in the linking machine; all of such means being immediately available to the operator at the stuffing bench and incorporated in the package as integral parts thereof. The gage means and the scale may be provided at no appreciable cost to the manufacturer of the carton and constitute a distinct advantage in the use thereof both for shipping purposes and for determining the correct size of horn to be used in connection with the casing strands of a given package while also assuring uniformity in respect to diameter of the stuffed pre-linked casing and the length of the links, all three factors being of considerable practical importance for the reasons above stated.

It will be understood that variations in detail may be resorted to without departing from the field and scope of my invention, and I intend to include all such variations, as fall within the scope of the appended claims, in this application in which the preferred form only of my invention has been disclosed.

I claim:

1. In a package of artificial sausage casings, a carton formed of moisture resistant material and substantially oblong in plan and of rectangular cross section, said carton having two side and two end walls, outer top closure flaps hinged at their outer edges to the upper edges of said side walls, inner top closure flaps hinged at their outer edges to the upper edges of said end walls, bottom closure means for said carton, and a plurality of shirred artificial sausage casings within said carton disposed lengthwise thereof, said outer top closure flaps seating on and completely covering said inner top closure flaps when all of said top closure flaps are closed, one of said inner top closure flaps having therein a substantially rectangular slot extending from its inner edge, the outer portion of said slot being substantially semicircular and the sides of said slot being straight and flaring inward from said outer portion and being of materially greater length than the diameter of said outer portion, said one inner top closure flap also having therein a circular opening of a diameter approximately one half the diameter of said outer portion of said slot.

2. In a package of artificial sausage casings, a carton formed of moisture resistant material and substantially oblong in plan and of rectangular cross section, said carton having two side and two end walls, outer top closure flaps hinged at their outer edges to the upper edges of said side walls, inner top closure flaps hinged at their outer edges to the upper edges of said end walls, upper bottom closure flaps hinged at their outer edges to the lower edges of said side walls, one of said upper bottom closure flaps having a linear measuring scale on its outer face and along its inner edge disposed to be covered by the other upper bottom closure flap when the latter is in closed position underlying said one upper bottom closure flap, lower bottom closure flaps hinged at their outer edges to the lower edges of said end walls, said bottom closure flaps having cooperating quick release means for securing them together in closed position, and a plurality of shirred artificial sausage casings within said carton disposed lengthwise thereof, said outer top closure flaps seating on and completely covering said inner top closure flaps when all of said top closure flaps are closed, one of said inner top closure flaps having therein a substantially rectangular slot extending from its inner edge, the outer portion of said slot being substantially semicircular and the sides of said slot being straight and flaring inward from said outer portion and being of materially greater length than the diameter of said outer portion, said one inner top closure flap also having therein a circular opening of a diameter approximately one half the diameter of said outer portion of said slot.

References Cited in the file of this patent

UNITED STATES PATENTS

| | | |
|---|---|---|
| Re. 23,257 | Hunsworth | Aug. 22, 1950 |
| 867,011 | Bromley | Sept. 24, 1907 |
| 1,212,279 | Stone | Jan. 16, 1917 |
| 1,780,558 | Kavanau | Nov. 4, 1930 |
| 1,848,859 | Wishart | Mar. 8, 1932 |
| 2,028,691 | Schenk | Jan. 21, 1936 |
| 2,053,857 | Weiss | Sept. 8, 1936 |
| 2,181,329 | Hewitt | Nov. 28, 1939 |
| 2,531,090 | Turner | Nov. 21, 1950 |
| 2,596,261 | Liskin | May 13, 1952 |
| 2,727,675 | Mairs et al. | Dec. 20, 1955 |